United States Patent
Aliev et al.

(10) Patent No.: US 9,081,752 B2
(45) Date of Patent: Jul. 14, 2015

(54) REDUNDANT DISK ENCODING VIA ERASURE DECODING

(71) Applicant: EMC Corporation, Hopkinton, MA (US)

(72) Inventors: Artem Alexandrovich Aliev, St. Petersburg (RU); Peter Vladimirovich Trifonov, St. Petersburg (RU)

(73) Assignee: EMC Corporation, Hopkinton, MA (US)

( * ) Notice: Subject to any disclaimer, the term of this patent is extended or adjusted under 35 U.S.C. 154(b) by 288 days.

(21) Appl. No.: 13/784,000

(22) Filed: Mar. 4, 2013

(65) Prior Publication Data

US 2014/0006850 A1    Jan. 2, 2014

Related U.S. Application Data

(63) Continuation of application No. PCT/RU2012/000520, filed on Jun. 29, 2010.

(51) Int. Cl.
  *H03M 13/00* (2006.01)
  *G06F 11/20* (2006.01)

(52) U.S. Cl.
  CPC ........ *G06F 11/2053* (2013.01); *G06F 11/2094* (2013.01)

(58) Field of Classification Search
  CPC .................. H03M 13/154; H03M 13/1515
  See application file for complete search history.

(56) References Cited

U.S. PATENT DOCUMENTS

| 5,942,005 | A  | * | 8/1999  | Hassner et al. | 714/784 |
|-----------|----|---|---------|----------------|---------|
| 7,900,122 | B2 | * | 3/2011  | Shen et al.    | 714/784 |
| 8,181,090 | B1 |   | 5/2012  | Corbett et al. |         |
| 8,832,524 | B2 | * | 9/2014  | Bennett        | 714/755 |
| 2007/0288833 | A1 | * | 12/2007 | Djurdjevic et al. | 714/784 |
| 2010/0115335 | A1 | * | 5/2010 | Wylie et al.   | 714/25  |
| 2010/0251071 | A1 | * | 9/2010 | Fujiwara       | 714/763 |

FOREIGN PATENT DOCUMENTS

| RU | 2310273 C2 | 11/2007 |
| RU | 2441318 C1 | 1/2012 |
| WO | 01/89135 A2 | 11/2001 |

OTHER PUBLICATIONS

International Search Report from PCT/RU2012/000520, date of mailing Apr. 4, 2013, 2 pages.

\* cited by examiner

*Primary Examiner* — M. Mujtaba K Chaudry
(74) *Attorney, Agent, or Firm* — BainwoodHuang

(57) ABSTRACT

A method is provided of encoding data within a RAID stripe, the RAID stripe being spread across k data disks and r redundancy disks of a RAID group, r≥3, the RAID group having k+r disks, the k data disks and the r redundancy disks within the RAID stripe being distinct, such that, upon failure of any r disks of the k+r disks of the RAID group, the data can be fully recovered using the Forney algorithm. The method includes (a) partitioning the data into k data symbols, (b) storing each of the k data symbols to a respective data disk of the k data disks, (c) generating r Reed-Solomon redundancy symbols by applying the Forney algorithm to the k data symbols, and (d) storing each of the r Reed-Solomon redundancy symbols generated by the Forney algorithm to a respective redundancy disk of the r redundancy disks.

14 Claims, 5 Drawing Sheets

REDUNDANT DISK ENCODING VIA ERASURE DECODING

CROSS-REFERENCE TO RELATED APPLICATIONS

This application is a Continuation of PCT International Patent Application No. PCT/RU2012/000520 filed on Jun. 29, 2012, entitled "REDUNDANT DISC ENCODING VIA ERASURE DECODING," the contents and teachings of which are hereby incorporated by reference in their entirety.

TECHNICAL FIELD

This disclosure relates to the fields of data storage and algebraic coding.

BACKGROUND ART

Redundant Arrays of Independent Disks (RAID) are commonly used to provide high performance and high reliability access to large amounts of data storage. There are several types of RAID, ranging from RAID 0 through RAID 6 (as well as some other combined types), although the most common for enterprise systems are RAID 5 and RAID 6. RAID 5 encodes stripes of data across a plurality of disks with one disk (which rotates from stripe to stripe) storing a parity redundancy code for that stripe, which allows stored data to be recovered even in the event of a disk failure. This parity code (often referred to as "row parity") involves performing a compound exclusive-or (XOR) operation on corresponding blocks on the different disks. RAID 6 employs a similar approach, but using two redundancy disks, allowing stored data to be recovered even in the event of two disk failures. There are several ways of calculating the values stored on the redundancy disks for RAID 6, such as even-odd parity (which involved storing row parity on one disk and diagonal parity on another disk) and Reed-Solomon encoding.

Conventional approaches to providing high performance high reliability access to large disk arrays make use of various algebraic coding techniques using any number of redundancy disks, examples of such coding techniques including Hamming encoding, Cauchy matrix encoding, and Reed-Solomon encoding. One approach utilizes three redundancy disks, encoded, respectively, with row parity, diagonal parity, and anti-diagonal parity. An example of the latter approach is provided in U.S. Pat. No. 7,640,484.

SUMMARY

Unfortunately, the above-described conventional approaches to providing high performance and high reliability access to large data arrays suffer from deficiencies. For example, RAID 6 and other techniques that employ two parity disks do not provide sufficient redundancy for large arrays with many disks. Approaches employing three redundancy disks provide somewhat more reliability, but many of these approaches are slow, while others do not scale above three redundancy disks, providing only limited utility. Approaches that employ an arbitrary number of redundancy disks can provide any desired degree of reliability, but these approaches do not scale well in performance as the number of redundancy disks increases. For example, in a system having k data disks and r redundancy disks, Cauchy matrix encoding and Reed-Solomon encoding have an algorithmic complexity of O(rk).

Therefore, it would be desirable to have a technique for reliably storing large amounts of data on large disk arrays having an arbitrary number of redundancy disks with improved performance, especially as the number of redundancy disks increases. The present disclosure provides techniques that utilize an erasure decoding approach (e.g., using the Forney Algorithm) to the initial encoding process for encoding redundancy data onto a plurality of redundancy disks with efficient performance. In some embodiments, virtual disk addressing over an address space of $2^m$ or $2^m-1$, for a positive integer m, via cyclotomic cosets is used, in combination with inverse cyclotomic fast Fourier transforms and/or direct cyclotomic fast Fourier transforms to optimize performance. Such optimizations allow these approaches to achieve a reduced complexity of O(k log log k).

In one embodiment, a method is provided of encoding data within a RAID stripe, the RAID stripe being spread across k data disks and r redundancy disks of a RAID group of a data storage system, r≥2, the RAID group having k+r disks, the k data disks and the r redundancy disks within the RAID stripe being distinct, such that, upon failure of any r disks of the k+r disks of the RAID group, the data can be fully recovered using the Forney erasure decoding algorithm. The method includes (a) partitioning the data into k data symbols, (b) storing each of the k data symbols to a respective data disk of the k data disks, (c) generating r Reed-Solomon redundancy symbols by applying the Forney erasure decoding algorithm to the k data symbols, and (d) storing each of the r Reed-Solomon redundancy symbols generated by the Forney erasure decoding algorithm to a respective redundancy disk of the r redundancy disks. Additional optimizations are also provided. An apparatus and computer program product are also provided for performing the method.

BRIEF DESCRIPTION OF DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

The present disclosure provides techniques that utilize an erasure decoding approach (e.g., using the Forney Algorithm) to the initial encoding process for encoding redundancy data onto a plurality of redundancy disks with efficient performance. In some embodiments, virtual disk addressing over an address space of $2^m$ or $2^m-1$, for a positive integer m, via cyclotomic cosets is used, in combination with inverse cyclotomic fast Fourier transforms and/or direct cyclotomic fast Fourier transforms to optimize performance. Such optimizations allow these approaches to achieve a reduced complexity of $O(k \log \log k)$.

Figure 1:
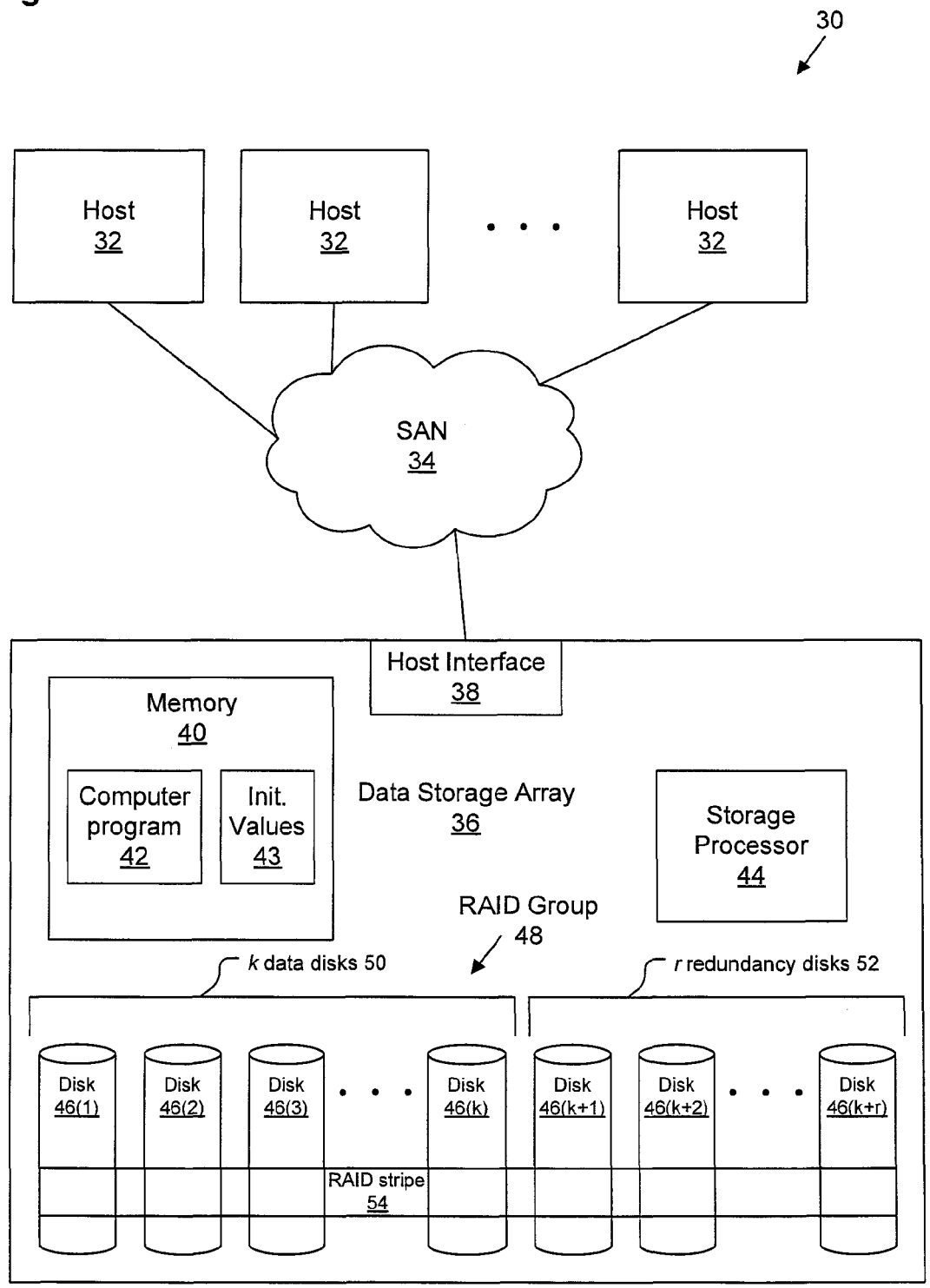
FIG. 1 illustrates an example system for use in conjunction with various embodiments.

FIG. 1 illustrates an example data storage system 30 for use in performing various embodiments. A plurality of host computers 32 generate data storage commands to store data into and load data from one or more data storage arrays 36 via a storage area network (SAN) 34. It should be understood that a SAN 34 is depicted by way of example only. Hosts 32 can also communicate with data storage array 36 via any number of well-known communication media, such as, for example, a network, a local area network, a wide area network, a point-to-point connection, or a fabric of circuits and switches. It should also be understood that, in some embodiments, the functions of host 32 can be integrated into the data storage array 36 itself, such as, for example, if a user's personal computer is configured with a local array of disks that require high reliability.

Data storage array 36 includes a host interface 38 for connecting to SAN 34 and receiving and responding to data storage commands from a host 32, memory 40, a storage processor 44, and disks 46. Memory 40 may include, for example, system memory, cache memory, volatile memory, random access memory, non-volatile memory, flash memory, data storage devices, some combination thereof, or another similar device or set of devices configured to store running software and/or data. Memory 40 stores executing and loaded code as well as associated data during execution, including an operating system, various drivers (not depicted), and a computer program 42, which, when executed, performs array encoding features, as described in further detail below, in connection with FIGS. 2-5. Memory 40 also stores initialization values 43, which may be used by computer program 42, as will be described in further detail below.

Storage processor 44 is a processor which is configured to perform data storage processing operations on behalf of a host 32. The processor may be, for example, a central processing unit, a microprocessor, a collection of multiple microprocessors, a digital signal processor, a field-programmable gate array, a collection of circuits configured to perform various operations, or another similar device or set of devices configured to perform operations. In some embodiments, instead of encoding features being implemented within computer program 42, these features are implemented directly within hardware circuits of storage processor 44.

Disks 46 (which may include any kind of storage drive, such as a hard disk, magnetic disk, optical disk, solid state storage device, etc.) may be arranged as one or more RAID groups 48. A RAID group 48 provides one large combined logical storage space made up of a number of individual disks 46. RAID group 48 is arranged into a plurality of RAID stripes 54, each of which spans all the disks 46 of the RAID group 48. Each RAID stripe may, for example, include one data storage block (e.g., 512 bytes, 4 kilobytes, 64 kilobytes, etc.) at a corresponding address on each disk 46 as is well-known in the art. Within a particular RAID stripe 54, an integer k of the disks 46 serve as data disks 50, while another integer r of the disks 46 serve as redundancy disks 52. RAID group 48 has a total of k+r disks 46. Typically, there are more data disks 50 than redundancy disks 52, so k>r. There are at least two redundancy disks 52 (so $r \geq 2$), although in some implementations, r is at least 3 or 4, so there are three (or four) or more redundancy disks 52. It should be understood that although disks $46(1)$-$46(k)$ have been depicted as data disks 50 and disks $46(k+1)$-$46(k+r)$ have been depicted as redundancy disks 52, that arrangement may not be correct for every RAID stripe 54. Typically, the assignment of the k data disks and the r redundancy disks to particular disks 46 rotates between the various RAID stripes 54 for performance reasons.

Having described the various systems, apparatuses, and associated constructs of and used in conjunction with various embodiments, this Description will now turn to describing various method embodiments which may be performed in conjunction with the above-described systems, apparatuses, and associated constructs. It should be understood that, in the interests of clarity to the reader, the amount of mathematical formulae presented in this Description has been kept to a minimum. Details of various equations and algorithms mentioned in this Description are presented in full in the Appendix, the teachings of which are incorporated in full herein by this reference.

Figure 2:
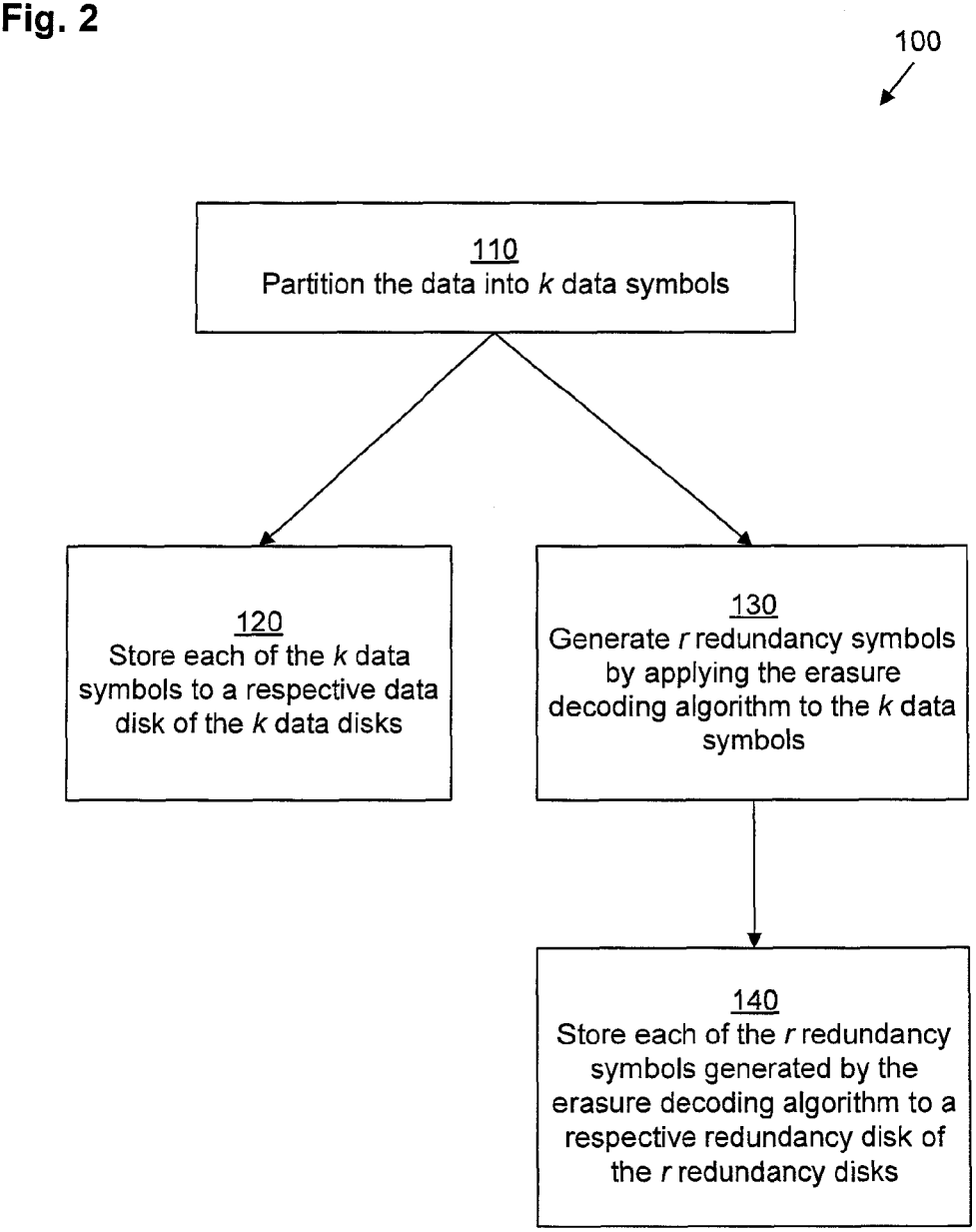
FIG. 2 illustrates an example method of encoding a redundant disk array according to various embodiments.

FIG. 2 illustrates an example method 100 performed by data storage array 36. Method 100 is typically performed by storage processor 44 while executing instructions stored in computer program 42. Method 100 is typically performed in response to a data storage WRITE command sent by a host 32 and received via host interface 38. Method 100 is executed when an entire RAID stripe 52 is to be written to disk or when the data to be written to disk is spread out across all disks 46 of the RAID stripe 54.

In step 110, data storage array 36 partitions the data to be written across the entire RAID stripe 54 into k portions. In some embodiments, each portion includes one or more symbols, such as bytes or other storage units. Thus, for example, if k=10, then 10 bytes of data would be split up into 10 consecutive 1-byte portions. As an additional example, if k=10 and 30 bytes are to be written to the RAID stripe, first disk 46(1) might be allocated bytes 1, 11, and 21 (which can be thought of as three data symbols), while second disk 46(2) might be allocated bytes 2, 12, and 22. In other embodiments, when more than k bytes are to be written to the RAID stripe 54, consecutive bytes are written to the same disk $46(z)$ until a full block has been written. For example, given a block size of 512 bytes and k=10, when 5,120 bytes are to be written to RAID stripe 54, bytes 0-511 are written to disk 46(1), bytes 512-1023 are written to disk 46(2), etc. For simplicity of description, unless otherwise stated, we will assume that a symbol is one byte and that the data to be written to the RAID stripe 54 is made up of exactly k bytes, each disk $46(z)$ storing exactly one of the k bytes.

In step 120 (which may be performed in parallel with steps 130-140), each of the k data symbols is stored on a respective data disk 50. The assignment of which disks 46 are data disks 50 will be described in further detail below, in connection with FIGS. 3-4.

In step 130, storage processor 44 generates r redundancy symbols by applying an erasure decoding algorithm to the k data symbols. An erasure decoding algorithm is an algorithm which is normally used to recover data from a set of encoded disks when one or more of the disks is erased or otherwise made unavailable. Under maximum distance separable algebraic coding schemes, as long as no more than r disks 46 out of the total of k=r disks 46 are erased, the data on any of the erased disks can be recovered from the remaining disks (at least k disks remaining) by applying an erasure decoding algorithm. An example of a typical erasure decoding algorithm is the Forney algorithm, which applies to Reed-Solomon codes and is described in the Appendix.

An erasure decoding algorithm is typically used to recover from the failure of one of the disks 46 of the RAID group 48, to allow the data stored on the failed disk to be regenerated and stored on a fresh replacement disk. In this disclosure, instead of merely using an erasure decoding algorithm for recovering from a failure, the erasure decoding algorithm is used initially to encode the redundancy data. Since k data symbols are known, the r redundancy symbols can be recovered, as it were, by assuming that the symbols had once been created but have since been erased and applying the erasure decoding algorithm to "recover" the r redundancy symbols.

Additional detail with respect to step 130, including several optimizations, will be provided below, in connection with FIG. 4.

In step 140, data storage array 36 stores each of the r redundancy symbols generated by the erasure decoding algorithm to a respective redundancy disk 52.

Once method 100 has been performed, RAID stripe 54 stores data on k data disks 50 and redundancy codes for the data on r redundancy disks 52. Thus, if any one (or more, up to r) of the disks 46 fail, that disk (or disks) can be replaced with a fresh disk, and the fresh disk may be filled by applying the erasure decoding algorithm to the remaining disks. It is also possible to reconstruct the data "on demand" by applying the erasure decoding algorithm, i.e. not to wait for the disk to be rebuilt, but reconstruct the missing data on the fly as soon as an application requests it.

There are, of course, many different ways to implement method 100. Various implementations and optimizations are now described in various embodiments.

Figure 3:
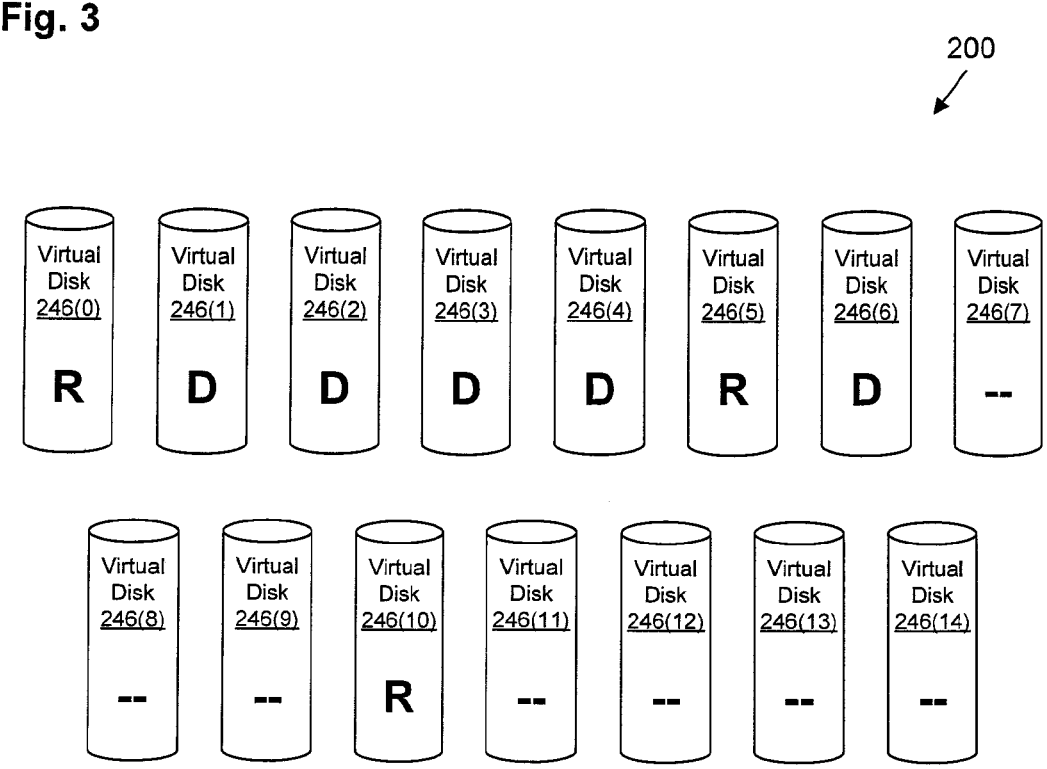
FIG. 3 illustrates an example virtual disk assignment scheme for shortening a Reed-Solomon codeword used in various embodiments.

In several embodiments, a shortened Reed-Solomon codeword approach is used. Disks 46 are assigned virtual disk numbers drawn from a set of $2^m-1$ addresses using a virtual addressing scheme, where m is a positive integer. An example virtual addressing scheme 200 is depicted in FIG. 3. In virtual addressing scheme 200, m=4, so each disk 46 may be assigned a virtual address ranging from 0 to $2^m-2=14$, inclusive. Thus, virtual addressing scheme 200 includes 15 virtual disks 246(0)-246(14). A virtual Reed-Solomon codeword can be constructed having r redundancy symbols and $2^m-r-1$ data symbols. However, if $2^m-r-1>k$, then we can arbitrarily assign a value of zero to $2^m-r-k-1$ of the data symbols, these being dummy symbols, which do not directly affect the computations. Thus, a shortened Reed-Solomon codeword can be extracted from the virtual Reed-Solomon codeword having the dummy symbols removed. In some embodiments, not depicted, an extended virtual Reed-Solomon codeword is used over an address space ranging from 0 to $2^m-2$, inclusive, with an additional address equal to $-\infty$, with $2^m$ total addresses, $2^m-r$ data symbols, and r redundancy symbols. In this case r−1 redundancy symbols are computed in the same way as in the above described case of a non-extended virtual Reed-Solomon code, and the additional r-th redundancy symbol is obtained as a sum of all other redundancy and data symbols.

In virtual addressing scheme 200, there are three redundancy disks 246(0), 246(5), and 246(10) (denoted by the character "R") with virtual disk numbers of 0, 5, and 10, respectively. There are five data disks 246(1), 246(2), 246(3), 246(4), and 246(6) (denoted by the character "D") with virtual disk numbers of 1, 2, 3, 4, and 6, respectively. There are seven dummy disks 246(7), 246(8), 246(9), 246(11), 246(12), 246(13), and 246(14) (denoted by the characters "--") with virtual disk numbers of 7, 8, 9, 11, 12, 13, and 14, respectively. It should be understood that different assignments of virtual disk numbers to the various sets of disk types are also possible. It should also be understood that m=4 is by way of example only. Any positive integer value of m could instead be used, such as, for example, m=8.

The use of these virtual disk numbers will now be explained in connection with FIG. 4. FIG. 4 depicts method step 130 in further detail according to several embodiments.

Figure 4:
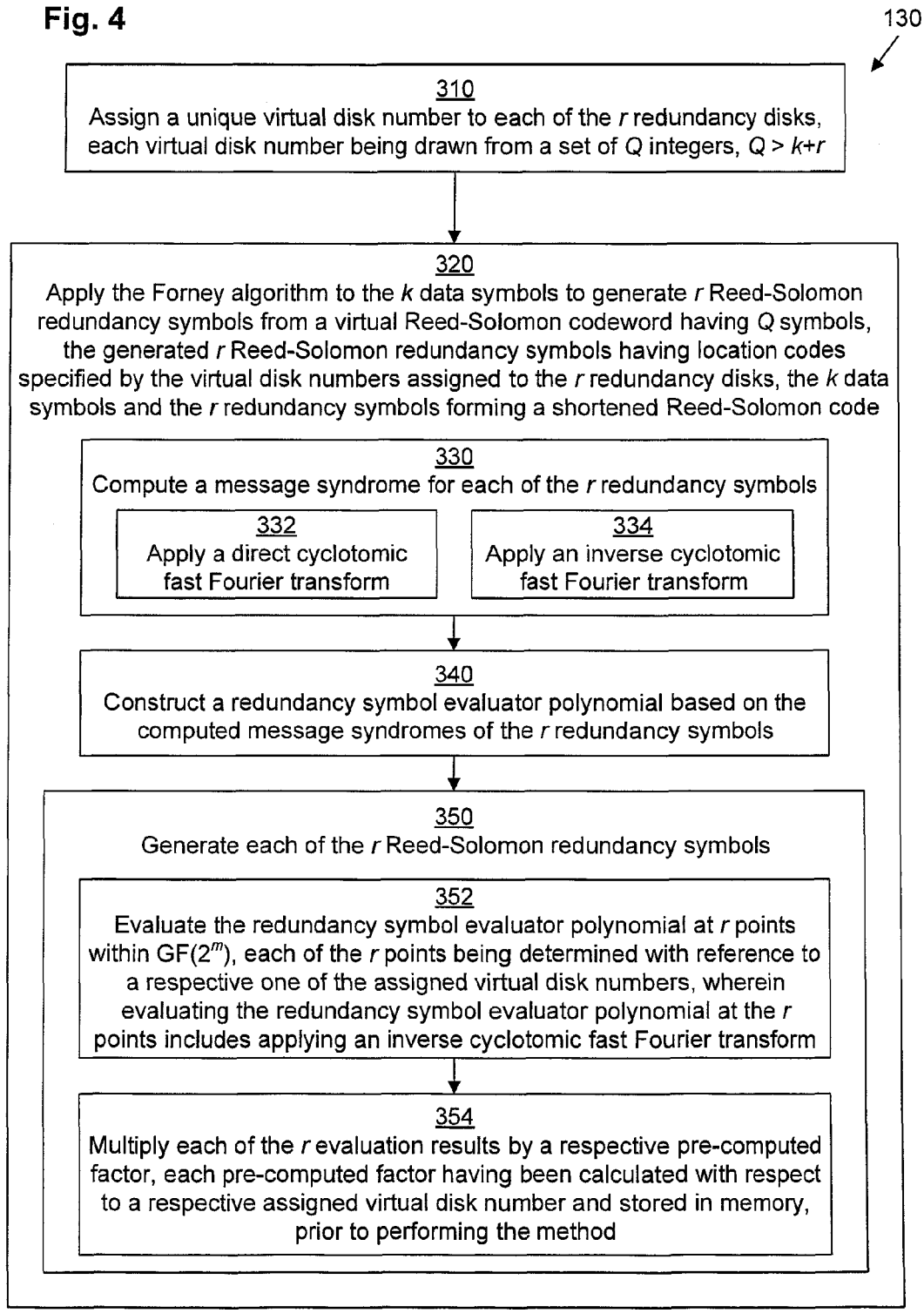
FIG. 4 illustrates additional details with respect to a step of the method shown in FIG. 3 according to various embodiments.

In the embodiments of FIG. 4, the erasure decoding algorithm is the Forney algorithm (see Appendix for details).

In step 310, storage processor 44 assigns a virtual disk number to each of the r redundancy disks, each virtual disk number being drawn from a set of Q integers, Q>k+r. In some embodiments, a virtual addressing scheme 200 as depicted in FIG. 3 is used, in which $Q=2^m-1$, while in other embodiments, a virtual addressing scheme may include an additional element $-\infty$.

In some embodiments, the virtual disk numbers assigned to the r redundancy disks span a minimal number of cyclotomic cosets modulo $2^m-1$ over a Galois Field of order $2^m$ ($GF(2^m)$). For example, for m=4, the cyclotomic cosets are {0}, {1, 2, 4, 8}, {3, 6, 12, 9}, {5, 10}, and {7, 14, 13, 11}. Thus, if r=3, then the only way to fully cover the cyclotomic cosets is by choosing {0} and {5, 10}. Therefore, the three redundancy disks are assigned virtual disk numbers of 0, 5, and 10, so a set of positions of redundancy symbols $U=\{u_0, u_1, \ldots, u_{r-1}\}=\{0, 5, 10\}$. Table 1 in the Appendix provides example values of the set of positions of redundancy symbols U for m=8 and Q=255 for different values of r, while Table 3 gives the complete set of cyclotomic cosets modulo $2^8-1$ over a Galois Field of order $2^8$. In some embodiments, virtual disk numbers are also assigned to the k data disks. In some embodiments, a set of positions of data symbols $V=\{v_0, v_1, \ldots, v_{k-1}\}$ is also assigned to a minimal number of cyclotomic cosets, while in other embodiments, the set of data symbol positions V is assigned to consecutive numbers exclusive of the elements of the set of positions of redundancy symbols U.

In step 320, storage processor 44 applies the Forney algorithm to the k data symbols to generate r Reed-Solomon redundancy symbols from a virtual Reed-Solomon codeword having Q symbols, the generated r Reed-Solomon redundancy symbols having location codes specified by the virtual disk numbers assigned to the r redundancy disks, the k data symbols and the r redundancy symbols forming a shortened Reed-Solomon code. In some embodiments, each data symbol and each redundancy symbol is m bits in size. Thus, for m=8, each symbol is 1 byte, which allows for convenient encoding. Each symbol may also represent an element of $GF(2^m)$ under an appropriate transformation. It should be understood that various calculations performed in applying the Forney algorithm are carried out within $GF(2^m)$, as will be apparent to one of ordinary skill in the art.

In some embodiments, step 320 may include applying the Forney algorithm using sub-steps 330-350. It should be understood that, before setting up the RAID group, certain computations are carried out and certain values are stored as initialization values 43 in memory 40. Thus a redundancy symbol locator polynomial $\Lambda(x)$ is pre-constructed and stored according to equation 19 from the Appendix. Example redundancy symbol locator polynomials $\Lambda(x)$ for various values of r are provided in Table 1 of the Appendix for m=8 and Q=255. In addition, a set of factors $\phi_i$ is pre-computed for integers i, $0 \leq i \leq r$ according to equation 20 in the Appendix (for any value of b, for example b=0).

In sub-step 330, storage processor 44 computes a message syndrome for each of the r redundancy symbols by applying equation 21 from the Appendix. This equation can be quite difficult to compute, so the calculations may utilize certain optimizations. If U and V are both assigned to span a minimal number of cyclotomic cosets, then storage processor 44 may employ a direct cyclotomic fast Fourier transform, as described in section 1.5.1 of the Appendix (sub-sub-step 332). Alternatively, if U is assigned to span a minimal number of cyclotomic cosets while V is assigned to consecutive values exclusive of the elements of U, then storage processor 44 may employ an inverse cyclotomic fast Fourier transform, as described in section 1.5.2 of the Appendix (sub-sub-step 334).

In sub-step 340, storage processor 44 constructs a redundancy symbol evaluator polynomial, $\Gamma(x)$, based on the computed message syndromes of the r redundancy symbols. For example, equation 16 of the Appendix may be used for this purpose. However, it should be understood that if Q is divisible by r, then an optimization may be utilized to simplify this sub-step. If Q is divisible by r, then the r redundancy position values U may be selected to equal iQ/r for each integer i from i=0 to i=r−1, inclusive, and the polynomial will be of form $$\sum_{i=0}^{r-1} S_i x^i \bmod r.$$

Thus, it is highly desirable to select a combination of r and m such that Q evenly divides r. In a typical implementation in which m=8 and Q=255, advantageous values of r include 3, 5, 15, and 17. However, if more than 5 but fewer than 15 redundancy disks are needed, then any intermediate value of r may be used with a small loss in performance, which would be offset by the gain in performance by not choosing r much too large.

In sub-step 350, storage processor 44 generates each of the r Reed-Solomon redundancy symbols. Storage processor 44 may achieve this result by applying equation 22 from the Appendix. This equation may be applied in an optimized way with reference to sub-sub-steps 352 and 354.

In sub-sub-step 352, storage processor 44 evaluates the redundancy symbol evaluator polynomial, $\Gamma(x)$, at $\Gamma$ points within $GF(2^m)$, each of the r points being determined with reference to a respective one of the assigned virtual disk numbers of the r redundancy disks, wherein evaluating the redundancy symbol evaluator polynomial at the r points includes applying an inverse cyclotomic fast Fourier transform. Thus, given a generator element of $GF(2^m)$, $\alpha$, a storage processor 44 evaluates the expression $\Gamma(\alpha^{-u_i})$ using the inverse cyclotomic fast Fourier transform for every integer i from i=0 to i=r−1, inclusive.

In sub-sub-step 354, storage processor 44 multiplies each of the r evaluation results by a respective pre-computed factor, $\phi_i$, each pre-computed factor having been calculated with respect to a respective assigned virtual disk number and stored in memory, prior to performing the method. Recall that the $\phi_i$ were previously stored in memory 40 within initialization values 43.

Having described various embodiments in detail, it may be helpful to see an example. Although in most implementations, m=8 and Q=255, the equations being performed over $GF(2^8)$ (since this arrangement simplifies the encoding of data in bytes), a simplified example will be illustrated over $GF(2^4)$ with m=8 and Q=15. In this example, k=5 and r=3, as illustrated in FIG. 3.

Generator element $\alpha$ of $GF(2^4)$ is a root of a fourth degree primitive polynomial, such as, for example, $x^4+x+1=0$. Using a binary representation of elements of $GF(2^4)$, $\alpha$ may be represented as 0100, while $\alpha^0$ may be represented as 1000, $\alpha^2$ as 0010, and $\alpha^3$ as 0001. Thus, a nibble of data, expressed in binary format, may be easily transformed into an element of $GF(2^4)$.

Prior to initializing the RAID group 54, various initialization values 43 are pre-computed and stored in memory 40. Redundancy symbol position set $U=\{u_0, u_1, u_2\}$ is assigned as $\{0, 5, 10\}$, while data symbol position set $V=\{v_0, v_1, v_2, v_3, v_4\}$ is assigned as $\{1, 2, 3, 4, 6\}$, as depicted in FIG. 3. Redundancy symbol locator polynomial $\Lambda(x)$ is pre-constructed by applying equation 19 from the Appendix, to yield $(1-x)(1-\alpha^5 x)(1-\alpha^{10} x)$, which when simplified over $GF(2^4)$, yields $\Lambda(x)=1+x^3$. We can easily calculate $\Lambda'(x)=x^2$, so we can easily pre-compute the set of factors $\phi_i$ for integers i, $0 \le i < r$ according to equation 20 in the Appendix (for any value of b, for example b=0). Thus vectorizing the set of factors $\phi_i$, we obtain $\Phi=\{1, \alpha^{15}, \alpha^{30}\}=\{1, 1, 1\}$.

Turning now to application of method 100, let us assume that the following set of data is received by the storage processor 44 in a WRITE command (in hexadecimal format): 12483. In step 110, this data can be converted into a 5 data symbol message vector $M=\{1, 2, 4, 8, 3\}$, or, in binary-coded $GF(2^4)$, $\{1000, 0100, 0010, 0001, 1100\}$. In step 120, each binary data symbol $m_i$ may be written within RAID stripe 54 to the appropriate data disk 50 having virtual disk number $v_i$ for $0 \le i < k$.

In step 130, Storage processor 44 generates the redundancy symbols $c_i$ for $0 \le i < r$. Turning to FIG. 3, in step 310, storage processor 44 assigns a virtual disk number to the r redundancy disks with reference to redundancy symbol position set $U=\{0, 5, 10\}$. In step 320, storage processor 44 applies the Forney algorithm to generate the redundancy symbols $c_i$ for $0 \le i < r$.

In sub-step 330, storage processor 44 is able to calculate a syndrome vector S, such that $$S_i = \sum_{j=0}^{k-1} m_j \alpha^{v_j i}$$

for $0 \le i < r$ by applying (in sub-sub-step 334) an inverse cyclotomic fast Fourier transform, yielding $S=\{\alpha^2(1+\alpha), 0, \alpha^3+\alpha+1\}$ or $S(x)=(\alpha^3+\alpha+1)x^2+\alpha^2+\alpha^3$. In sub-step 340, storage processor 44 is able to construct the redundancy symbol evaluator polynomial, $\Gamma(x)$. Since the redundancy symbol locator polynomial $\Lambda(x)=1+x^3$ is congruent to 1 modulo $x^3$, one immediately obtains $\Gamma(x)=S(x)$ without any computation (notice that Q=15 divides r=3 and we have chosen $U=\{0, 5, 10\}$, the elements of which are of form iQ/r).

In sub-step 350, storage processor 44 calculates the redundancy symbols $c_i$ for $0 \le i < r$ by applying sub-sub-steps 352 and 354. In sub-sub-step 352, storage processor 44 evaluates $\Gamma(x)$ at $\alpha^{-u_i}$ for $0 \le i < r$. This is done efficiently by using an inverse cyclotomic fast Fourier transform, yielding $\{\alpha^2+\alpha+1, \alpha+1, \alpha^3\}$. In sub-step 350, storage processor 44 multiplies each element by the respective element of $\Phi$, which, in this case, is trivial, since $\Phi=\{1, 1, 1\}$, yielding redundancy symbols of $C=\{\alpha^2+\alpha+1, \alpha+1, \alpha^3\}=\{1110, 1100, 0001\}$.

Returning to step 140, each binary redundancy symbol $c_i$ may be written within RAID stripe 54 to the appropriate data disk 50 having virtual disk number $v_i$ for $0 \le i < r$. Thus, after application of method 100, the following virtual symbols have been generated: $\{1110, 1000, 0100, 0010, 0001, 1100, 1100, 0000, 0000, 0000, 0001, 0000, 0000, 0000, 0000\}$, although seven of these virtual values (i.e., those in positions corresponding neither to information nor to redundancy symbols) are dummy values that are never written to disk.

Having described how data is encoded into a RAID stripe 54, we now turn to how a RAID stripe 54 is updated efficiently when only some of the data changes.

Figure 5:
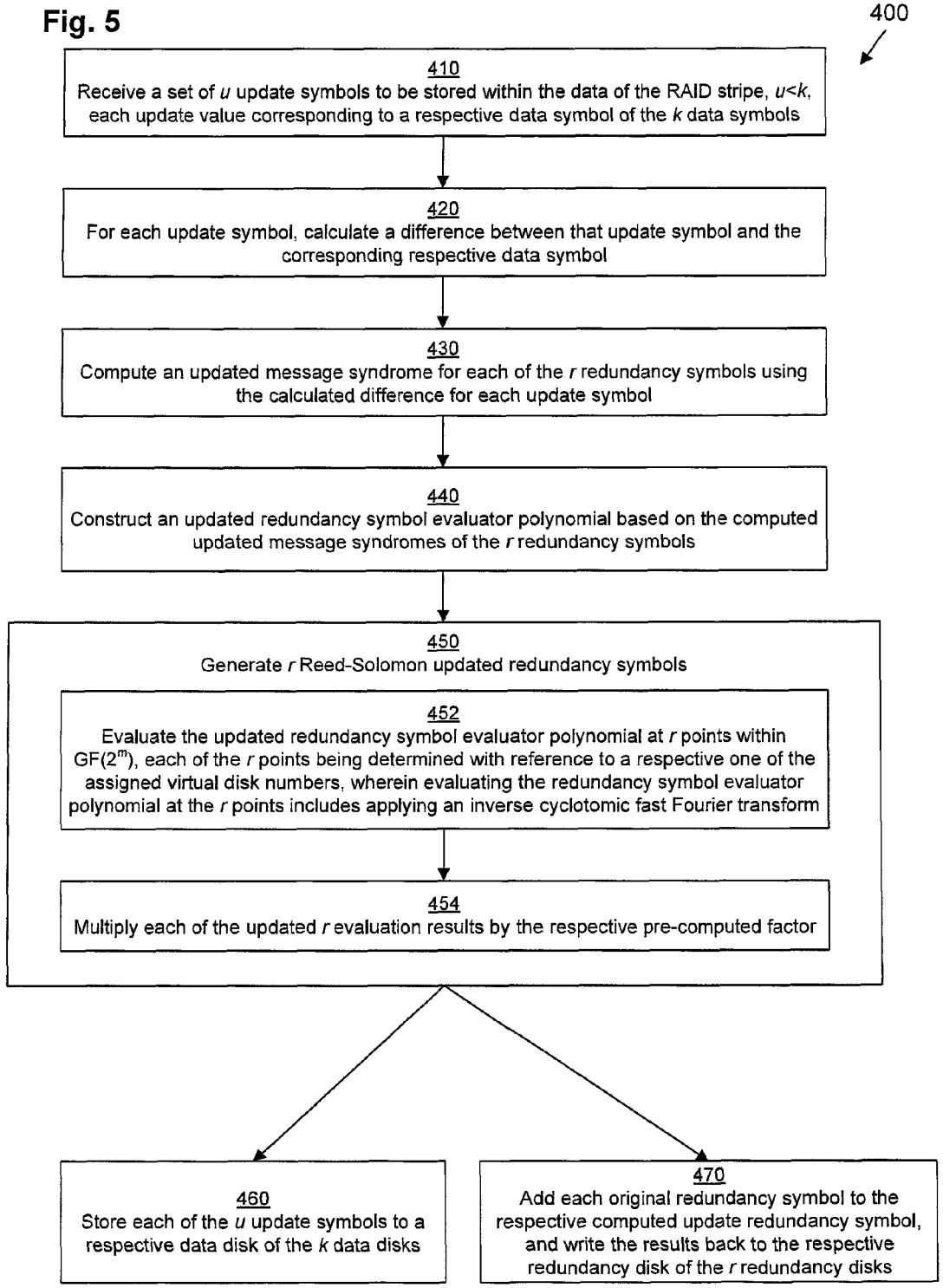
FIG. 5 illustrates an example method of partially updating a stripe of a redundant disk array according to various embodiments.

FIG. 5 depicts a method 400 of performing partial stripe update once data has already been stored within RAID stripe 54. See section 1.6.3 of the Appendix. In step 410, data storage array 36 receives a set of u update symbols to be stored within the data of the RAID stripe, u<k, each update value corresponding to a respective data symbol of the k data symbols. In step 420, for each update symbol, storage processor 44 calculates a difference between that update symbol and the corresponding respective data symbol. In step 430, storage processor 44 computes an update message syndrome for each of the r redundancy symbols using the calculated difference for each update symbol instead of using the original data symbol (as was done in sub-step 330, above).

In step 440, storage processor 44 constructs an update redundancy symbol evaluator polynomial (see sub-step 340, above) based on the computed updated message syndromes of the r redundancy symbols. In step 450, storage processor 44 generates r Reed-Solomon update redundancy symbols by (sub-step 452) evaluating the update redundancy symbol evaluator polynomial at r points within $GF(2^m)$, each of the r points being determined with reference to a respective one of the assigned virtual disk numbers, wherein evaluating the update redundancy symbol evaluator polynomial at the r points includes applying the inverse cyclotomic fast Fourier transform (see sub-sub-step 352, above) and (sub-step 454) multiplying each of the updated r evaluation results by the respective pre-computed factor (see sub-sub-step 354, above).

In step 460, storage processor 44 stores each of the u update symbols to a respective data disk of the k data disks (see step 120, above). In step 470, storage processor 44 fetches the original values of redundancy symbols, adds them to the computed r update redundancy symbols, and writes the results back to the respective redundancy disks of the r redundancy disks (see step 140, above).

Thus, various techniques have been provided for encoding redundancy data onto a plurality of redundancy disks with efficient performance utilizing an erasure decoding approach (e.g., using the Forney Algorithm) in the initial encoding process.

While various embodiments of the present disclosure have been particularly shown and described, it will be understood by those skilled in the art that various changes in form and details may be made therein without departing from the spirit and scope of the present disclosure as defined by the appended claims.

It should be understood that although various embodiments have been described as being methods, software embodying these methods is also included. Thus, one embodiment includes a tangible computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

Finally, nothing in this Specification shall be construed as an admission of any sort. Even if a technique, method, apparatus, or other concept is specifically labeled as "prior art" or as "conventional," Applicants make no admission that such technique, method, apparatus, or other concept is actually prior art under 35 U.S.C. §102, such determination being a legal determination that depends upon many factors, not all of which are known to Applicants at this time.

What is claimed is:

1. A method of encoding data within a RAID stripe, the RAID stripe being spread across k data disks and r redundancy disks of a RAID group of a data storage system, r≥2, the RAID group having k+r disks, the k data disks and the r redundancy disks within the RAID stripe being distinct, such that, upon failure of any r disks of the k+r disks of the RAID group, the data can be fully recovered using the Forney erasure decoding algorithm, the method including:
   partitioning the data into k data symbols;
   storing each of the k data symbols to a respective data disk of the k data disks;
   generating r Reed-Solomon redundancy symbols by applying the Forney erasure decoding algorithm to the k data symbols; and
   storing each of the r redundancy symbols generated by the Forney erasure decoding algorithm to a respective redundancy disk of the r redundancy disks.

2. The method of claim 1 wherein generating the r redundancy symbols by applying the Forney erasure decoding algorithm includes:
   assigning a unique virtual disk number to each of the r redundancy disks, each virtual disk number being drawn from a set of Q integers, Q>k+r; and
   applying the Forney erasure decoding algorithm to the k data symbols to generate the r Reed-Solomon redundancy symbols from a virtual Reed-Solomon codeword having Q symbols, the generated r Reed-Solomon redundancy symbols having location codes specified by the virtual disk numbers assigned to the r redundancy disks, the k data symbols and the r redundancy symbols forming a shortened Reed-Solomon code.

3. The method of claim 2 wherein:
   $Q=2^m-1$, m being an integer greater than 2, the set of Q integers including all integers from 0 to $2^m-2$, inclusive; and
   assigning the unique virtual disk number to each of the r redundancy disks includes choosing r numbers from the set of Q integers, the r chosen numbers spanning a minimal number of cyclotomic cosets modulo $2^m-1$ over a Galois Field of order $2^m$ [$GF(2^m)$], the r chosen numbers being the assigned virtual disk numbers.

4. The method of claim 3 wherein applying the Forney erasure decoding algorithm to the k data symbols to generate the r Reed-Solomon redundancy symbols includes:
   computing a message syndrome vector having r elements;
   constructing a redundancy symbol evaluator polynomial based on the computed message syndrome vector; and
   generating each of the r Reed-Solomon redundancy symbols by:
      evaluating the redundancy symbol evaluator polynomial at r points within $GF(2^m)$, each of the r points being determined with reference to a respective one of the assigned virtual disk numbers, wherein evaluating the redundancy symbol evaluator polynomial at the r points includes applying an inverse cyclotomic fast Fourier transform; and
      multiplying each of the r evaluation results by a respective pre-computed factor, each pre-computed factor having been calculated with respect to a respective assigned virtual disk number and stored in memory, prior to performing the method.

5. The method of claim 4 wherein computing the message syndrome vector includes applying a direct cyclotomic fast Fourier transform.

6. The method of claim 5 wherein storing each of the k data symbols to its respective data disk of the k data disks includes assigning a unique virtual disk number to each of the k data disks, each virtual disk number being drawn from the set of Q integers, wherein assigning the unique virtual disk number to each of the k data disks includes choosing k numbers from the set of Q integers, the k chosen numbers spanning a minimal number of cyclotomic cosets over $GF(2^m)$ exclusive of the cyclotomic cosets used in connection with assigning the virtual disk number to the r redundancy disks, the k chosen numbers being the assigned virtual disk numbers assigned to the k data disks.

7. The method of claim 4 wherein computing the message syndrome vector includes applying an inverse cyclotomic fast Fourier transform.

8. The method of claim 7 wherein storing each of the k data symbols to its respective data disk of the k data disks includes assigning a unique virtual disk number to each of the k data disks, each virtual disk number being drawn from the set of Q integers, wherein assigning the unique virtual disk number to each of the k data disks includes choosing k numbers from the set of Q integers, the k chosen numbers being consecutive integers exclusive of the virtual disk number assigned to the r redundancy disks, the k chosen numbers being the assigned virtual disk numbers assigned to the k data disks.

9. The method of claim 4 wherein:
Q is divisible by r;
choosing the r numbers from the set of Q integers, the r chosen numbers spanning a minimal number of cyclotomic cosets over $GF(2^m)$, includes choosing the numbers iQ/r for each integer i from i=0 to i=r−1, inclusive;
the redundancy symbol evaluator polynomial has degree r−1; and
constructing the redundancy symbol evaluator polynomial based on the computed message syndromes of the r redundancy symbols includes assigning the redundancy symbol evaluator polynomial to be a summation of r monomial terms, each of the r monomial terms having a coefficient set to a respective element of the computed message syndrome vector.

10. The method of claim 4 wherein:
m=8; and
each data symbol and each redundancy symbol is 1 byte in size.

11. The method of claim 4 wherein the method further includes:
receiving a set of u update symbols to be stored within the data of the RAID stripe, u<k, each update value corresponding to a respective data symbol of the k data symbols;
for each update symbol, calculating a difference between that update symbol and the corresponding respective data symbol;
computing an update message syndrome for each of the r redundancy symbols using the calculated difference for each update symbol;
constructing an update redundancy symbol evaluator polynomial based on the computed update message syndromes of the r redundancy symbols;
generating r Reed-Solomon update redundancy symbols by:
evaluating the update redundancy symbol evaluator polynomial at r points within $GF(2^m)$, each of the r points being determined with reference to a respective one of the assigned virtual disk numbers, wherein evaluating the update redundancy symbol evaluator polynomial at the r points includes applying the inverse cyclotomic fast Fourier transform; and multiplying each of the updated r evaluation results by the respective pre-computed factor;
storing each of the u update symbols to a respective data disk of the k data disks; and
incrementing each of the stored r redundancy symbols by the respective update redundancy symbol on the respective redundancy disk of the r redundancy disks.

12. The method of claim 1 wherein generating the r redundancy symbols by applying the Forney erasure decoding algorithm includes:
assigning a unique virtual disk number to each of the r redundancy disks, each virtual disk number being drawn from a set of Q values, Q>k+r, $Q=2^m$, m being an integer greater than 2, the set of Q values including all integers from 0 to $2^m−1$, inclusive, and value −∞, wherein assigning the unique virtual disk number to each of the r redundancy disks includes choosing r numbers from the set of Q values, the r chosen numbers spanning a minimal number of cyclotomic cosets modulo $2^m−1$ over a Galois Field of order $2^m$ [$GF(2^m)$], the r chosen numbers being the assigned virtual disk numbers; and
applying the Forney erasure decoding algorithm to the k data symbols to generate the r Reed-Solomon redundancy symbols from a virtual Reed-Solomon codeword having Q symbols, the generated r Reed-Solomon redundancy symbols having location codes specified by the virtual disk numbers assigned to the r redundancy disks, the k data symbols and the r redundancy symbols forming a shortened Reed-Solomon code.

13. An apparatus comprising:
a set of k+r disks configured as a RAID group;
a host interface for receiving data storage commands; and
a storage processor, the storage processor being constructed and arranged to encode data received by the host interface within a RAID stripe, the RAID stripe being spread across k data disks and r redundancy disks of the RAID group, r≥3, the k data disks and the r redundancy disks within the RAID stripe being distinct, such that, upon failure of any r disks of the k+r disks of the RAID group, the data can be fully recovered using the Forney erasure decoding algorithm, wherein the storage processor is configured to encode the data by:
partitioning the data into k data symbols;
storing each of the k data symbols to a respective data disk of the k data disks;
generating r Reed-Solomon redundancy symbols by applying the Forney erasure decoding algorithm to the k data symbols; and
storing each of the r Reed-Solomon redundancy symbols generated by the Forney erasure decoding algorithm to a respective redundancy disk of the r redundancy disks.

14. A computer program product comprising a tangible non-transitory computer-readable storage medium, the tangible non-transitory computer-readable storage medium storing instructions, which, when executed by a computer, cause the computer to encode data within a RAID stripe, the RAID stripe being spread across k data disks and r redundancy disks of a RAID group of a data storage system, r≥3, the RAID group having k+r disks, the k data disks and the r redundancy disks within the RAID stripe being distinct, such that, upon failure of any r disks of the k+r disks of the RAID group, the data can be fully recovered using the Forney erasure decoding algorithm, wherein the computer, when encoding the data within the RAID stripe, is configured to:
partition the data into k data symbols;
store each of the k data symbols to a respective data disk of the k data disks;

generate r Reed-Solomon redundancy symbols by applying the Forney erasure decoding algorithm to the k data symbols; and store each of the r Reed-Solomon redundancy symbols generated by the Forney erasure decoding algorithm to a respective redundancy disk of the r redundancy disks.

* * * * *